United States Patent
Djordjevic

(10) Patent No.: US 7,912,611 B2
(45) Date of Patent: Mar. 22, 2011

(54) DEVICE FOR SENSING THE POSITION OF A SPOILER ON A MOTOR VEHICLE

(75) Inventor: Dejan Djordjevic, Stuttgart (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 696 days.

(21) Appl. No.: 11/955,423

(22) Filed: Dec. 13, 2007

(65) Prior Publication Data

US 2008/0154465 A1      Jun. 26, 2008

(30) Foreign Application Priority Data

Dec. 13, 2006   (DE) .................... 10 2006 058 722

(51) Int. Cl.
    *B62D 37/02*    (2006.01)
(52) U.S. Cl. .................... 701/49; 296/180.1; 296/180.5; 310/12.01; 324/207.2
(58) Field of Classification Search .................... 701/49; 296/180.1, 180.5; 310/12.01; 324/207.11–207.26
    See application file for complete search history.

(56) References Cited

U.S. PATENT DOCUMENTS

| | | | |
|---|---|---|---|
| 4,810,022 A | | 3/1989 | Takagi et al. |
| 6,320,342 B1 * | | 11/2001 | Yoshioka et al. ............. 318/467 |
| 6,497,035 B1 * | | 12/2002 | Ratliff ............................. 29/596 |
| 6,540,282 B2 * | | 4/2003 | Pettey ........................ 296/180.5 |
| 6,565,145 B2 * | | 5/2003 | Pettey ........................ 296/180.5 |
| 6,575,522 B2 * | | 6/2003 | Borghi et al. .............. 296/180.5 |
| 6,700,345 B2 * | | 3/2004 | Wilkens ....................... 318/626 |

FOREIGN PATENT DOCUMENTS

| | | |
|---|---|---|
| DE | 3512378 C2 | 10/1985 |
| DE | 10348285 A1 | 5/2005 |
| DE | 102004043402 A1 | 3/2006 |
| JP | 08258754 A | 10/1996 |

OTHER PUBLICATIONS

European Search Report dated Apr. 4, 2008.

* cited by examiner

*Primary Examiner* — Thomas G Black
*Assistant Examiner* — Peter D Nolan

(57) ABSTRACT

A device for sensing a position of a spoiler on a motor vehicle, where the spoiler is moved with a drive unit between a retracted setpoint base position and an extended setpoint operating position. At least one sensor is provided with which at least one of the setpoint positions of the spoiler can be sensed, and which generates first position signals on the basis of the sensed setpoint position. An adjustment position sensing device is provided which senses a current position of the spoiler, and which generates second position signals on the basis of the sensed current position. An evaluation unit evaluates the first position signals and the second position signals, and which actuates, on the basis of the evaluation result, an information device which provides the driver with information about the state of at least one of the position sensing devices and/or actuates the drive unit.

7 Claims, 2 Drawing Sheets

DEVICE FOR SENSING THE POSITION OF A SPOILER ON A MOTOR VEHICLE

CROSS REFERENCE TO RELATED APPLICATION

This application claims the priority, under 35 U.S.C. §119, of German application DE 10 2006 058 722.7-21, filed Dec. 13, 2007; the prior application is herewith incorporated by reference in its entirety.

BACKGROUND OF THE INVENTION

Field of the Invention

The invention relates to a device for sensing the position of a spoiler on a motor vehicle, where the spoiler can be moved with a drive unit between a retracted setpoint base position and at least one extended setpoint operating position. At least one sensor is provided with which at least one of the setpoint positions of the spoiler can be sensed, and which generates first position signals on the basis of the sensed setpoint position.

Motor vehicles with adjustable spoilers or flow directing devices are known in various forms from the prior art. These spoilers, in particular rear mounted spoilers, have at least one air directing profile which can be adjusted with respect to the bodywork of the vehicle between a retracted position of rest and an extended operative position in which the spoiler in its entirety is located at a distance from the bodywork of the vehicle. For example, motor vehicles are known which have a rear mounted spoiler which is lowered into the body of the vehicle and can be adjusted into an operative position which lies outside the body of the vehicle. The recess in the bodywork corresponds here to the contour of the air directing profile, so that in the retracted position of rest the spoiler fits in a positively locking and precisely matching fashion into the contour of the bodywork. By activating a drive, the spoiler with its substructure is moved, for example, along a rail, and moves into its operative position out of the bodywork of the vehicle by virtue of an oblique arrangement of the rail. The slightly inclined orientation of the air directing profile in the operative position with respect to the position of rest is predefined and cannot be changed anymore during operation. In order to determine the position of the spoilers, sensors, in particular in particular Hall sensors, are used which detect or determine the end position of the respective operating state.

A disadvantage with the spoiler adjustment device as known from the prior art is, however, that the driver of the vehicle is not supplied with any information about the current operating state of the spoiler or the functional capability of the sensors, so that there is a risk of misinterpretation of the operating state of the spoiler by the driver of the vehicle.

BRIEF SUMMARY OF THE INVENTION

It is accordingly an object of the invention to provide a device for sensing the position of a spoiler on a motor vehicle that overcomes the above-mentioned disadvantages of the prior art devices of this general type, which provides the driver with information about the operating state or the functional capability of the spoiler or of one of the sensors.

With the foregoing and other objects in view there is provided, in accordance with the invention, a device for sensing a position of a spoiler on a motor vehicle. The spoiler can be moved with a drive unit between a retracted setpoint base position and at least one extended setpoint operating position. The device contains at least one Hall sensor for sensing at least one of the retracted setpoint base position and the extended setpoint operating position of the spoiler. The Hall sensor generates first position signals on a basis of a sensed setpoint position. An adjustment position sensing device is provided for sensing a current position of the spoiler and generates second position signals on a basis of a sensed current position. An information device is provided along with an evaluation unit for evaluating the first position signals supplied by Hall sensor and the second position signals supplied by the adjustment position sensing device. The evaluation unit, on a basis of an evaluation result, actuates the drive unit and/or the information device to provide a driver with information about a state of the Hall sensor.

The object is achieved according to the invention in that an adjustment position sensing device is provided with which the current position of the spoiler can be sensed, and which generates second position signals on the basis of the sensed current position. An evaluation unit is provided which evaluates the first position signals supplied by the Hall sensor and the second position signals supplied by the adjustment position sensing device, and which actuates, on the basis of the evaluation result, an information device which provides the driver with information about the state of at least one of the position sensing devices and/or actuates the drive unit. This has the advantage that the driver of the vehicle can be provided with information which allows him to determine a malfunction of the spoiler or a malfunction of at least one sensor and which can, for example inform the driver of the vehicle whether the spoiler has actually been extended or whether the functional capability of the sensor is ensured. Furthermore, by virtue of the redundancy of the signals, it is possible to make information available to the driver only if the spoiler has actually not reached the end position.

In one specific example, the device can have three sensors, in which case the drive unit can have two incremental signal transmitters and a third sensor can be assigned to an intermediate range.

The sensors can preferably be Hall sensors. If the spoiler is then transferred from a first position into a second position, the drive unit of the spoiler is actuated in the direction of the desired position until, for example, the signal edge of the third Hall sensor which is disposed in the intermediate range comes to a stop. The travel which has already been carried out can be counted by internal pulses, for example of the drive unit, and can be stored after each stop. The drive unit is located in a predefined setpoint tolerance range after the stop process. In order to monitor possible differences in position, it is then checked whether the adjustment position sensing device, which also followed the adjustment process in a redundant fashion, is located in the predefined setpoint tolerance range.

One embodiment also provides that the evaluation device is configured to sense an absence of Hall signals, and when Hall signals are absent after a predeterminable time, measured from the start of the movement of the spoiler to the at least one setpoint position, to decide, using the second position signals, whether the spoiler is located within a setpoint tolerance range about the at least one setpoint position, and if a) the evaluation unit decides that the spoiler is located in the setpoint tolerance range or if b) the evaluation unit decides that the spoiler is not located in the setpoint tolerance range, it actuates the drive unit and/or the information device. In other words, in the case a) it an be assumed that if the spoiler is located in its supposed position despite the absence of the Hall signals, there is a defect in the Hall sensor, or in the case b) it can be assumed that if the spoiler is not located in the setpoint tolerance range, there may be a defect in the drive unit of the spoiler. In both cases, the driver of the vehicle is informed by the information device and he can take corresponding steps immediately or when the motor vehicle is next started.

To be more precise, there is provision that in the case a) the information device can output a signal which can be perceived in a visual and/or acoustic and/or tactile fashion by the driver, which signal provides the driver with information about a possible defect in the Hall sensor, and in that in the case b) the information device can output a signal which can be perceived in a visual and/or acoustic and/or tactile fashion by the driver, which signal provides the driver with information about a possible defect in the drive unit. It is thus possible, for example, for the visual message "go to repair shop" to be issued to the driver on the combination instrument.

A further embodiment provides that the evaluation device is configured to compare the second position which is represented by the second position signals with the first position which is represented by the first position signals when the setpoint operating position is displayed by the Hall sensor, and if the deviation between the first position and the second position lies outside a predefinable position tolerance range, it actuates the drive unit and/or the information device. This can in turn mean that a defect is present at one of the components, and the driver of the vehicle is subsequently provided with information by the information device, but at the same time the spoiler is moved into its desired position by the actuation of the drive unit. A comparison between the first and second positions together with an adjustment of a predefined position tolerance range can therefore quickly and reliably indicate an incorrect position or a malfunction.

If a deviation between the first and second positions is detected, the information device can output a signal which can be perceived in a visual and/or acoustic and/or tactile fashion by the driver, which signal provides the driver with information about a possible defect in, for example, the Hall sensor.

Another embodiment provides that the adjustment position sensing device can be embodied on the drive device, in particular as a travel measuring device which contains an incremental signal transmitter and with which the travel carried out by the spoiler can be sensed. This has the advantage that a precise determination of the actual position of the spoiler, and thus indirectly of the drive device, is made possible.

One preferred embodiment provides that the adjustment position sensing device can have a restoring device with which a predetermined value for the position can be set when the first and second positions on the adjustment position sensing device correspond.

This is advantageous in particular if, for whatever reason, the spoiler is in an adjusted position and as a result new standardization of the end positions or settings of the spoiler can be carried out using the restoring key.

Other features which are considered as characteristic for the invention are set forth in the appended claims.

Although the invention is illustrated and described herein as embodied in a device for sensing the position of a spoiler on a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
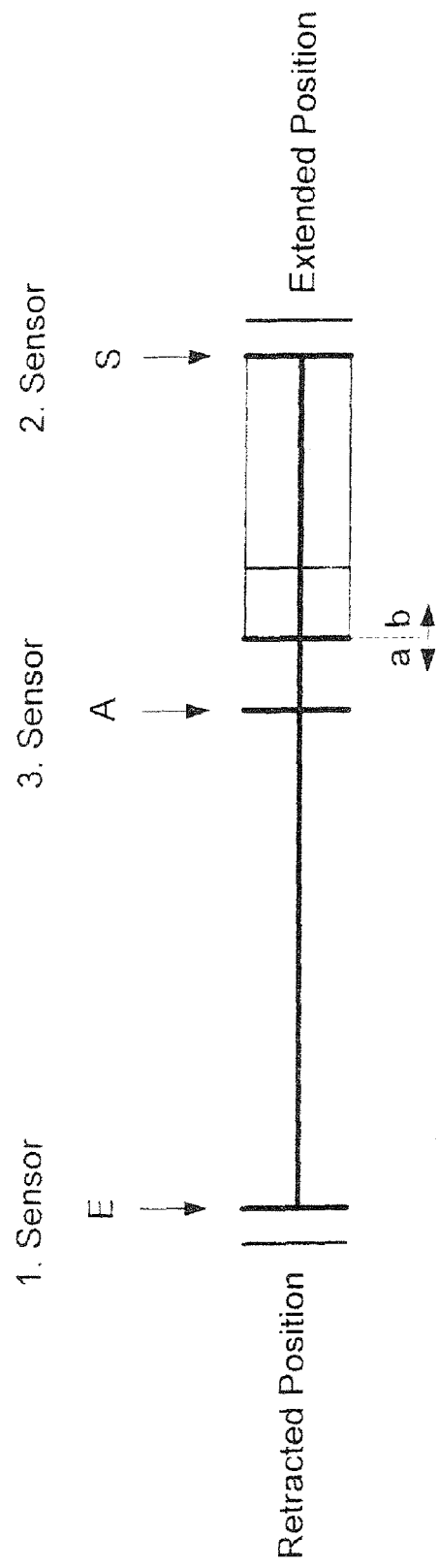
FIG. 1 is a schematic diagram of a functional principle of a device according to the invention.

Referring now to the figures of the drawing in detail, there is shown schematically the functional principle of the actuation of a spoiler using a third Hall sensor. As shown in FIG. 1, the device has three Hall sensors 1-3 with a first sensor 1 being assigned to a retracted setpoint base position (retracted E), a second sensor 2 being assigned to a setpoint operating position (S) and a third sensor 3 being assigned to an intermediate range (extended A). The spoiler configuration is just one possibility; it is also possible to dispose two sensors in a motor as incremental signal transmitters.

Figure 2:
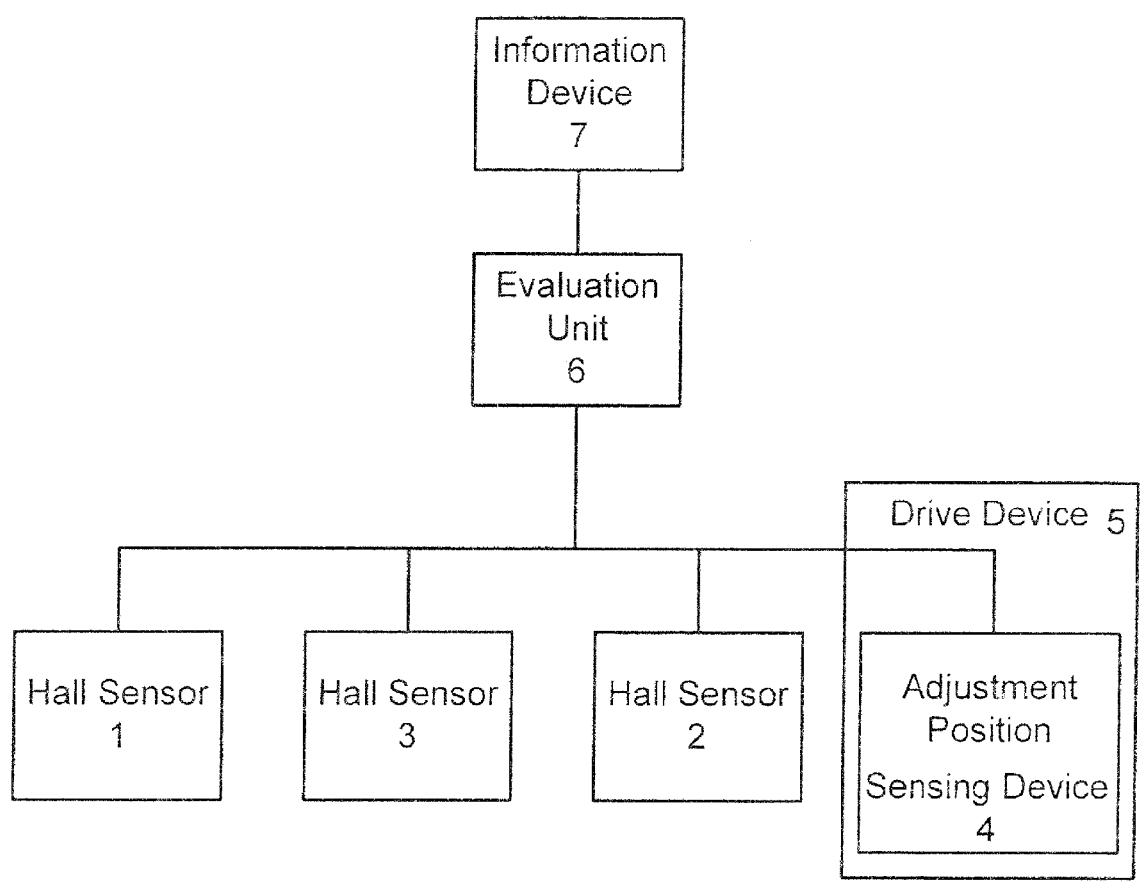
FIG. 2 is a block circuit diagram of a configuration for sensing a position of a spoiler.

If the spoiler is then moved from a first position into a second position, a drive unit 5 of the spoiler is actuated in the direction of the desired position until, for example, a signal edge of the third Hall sensor 3 which is disposed in the intermediate range comes to a stop. The travel which has already been carried out can be counted by internal pulses, for example of the drive unit 5, and stored after each stop. The drive unit 5 is located in a predefined setpoint tolerance range. In order to monitor possible differences in position, it is then checked whether an adjustment position sensing device 4, which followed the adjustment process in a redundant fashion and senses the travel is located in a predefined setpoint tolerance range (capture range). If it is not in the capture range, the setpoint position extended A can be assigned to the adjustment position sensing device 4. If, in another case, contact is not established with the third Hall sensor 3 even though the adjustment position sensing device 4 extends beyond the capture range, the drive device 5 is stopped immediately and a fault message is issued on the combination instrument. This can be done by a signal tone and/or a visual message for a necessary visit to a workshop. As shown in FIG. 2, an information device 7 is provided along with an evaluation unit 6 for evaluating the first position signals supplied by the Hall sensor and the second position signals supplied by the adjustment position sensing device 4. The evaluation unit 6, on a basis of an evaluation result, actuates the drive unit 5 and/or the information device 7 to provide a driver with information about a state of the Hall sensor.

If an unexpected fault occurs during an adjustment movement, the spoiler may be in a non-standardized state. In this case, automatic standardization can be carried out using, for example, the third Hall sensor. When the spoiler is next extended into a predefined position, the operating mode runs as described above and a new characteristic number can be assigned to the adjustment position sensing device.

The principle of the device or function which is disclosed here has been described above using just one exemplary embodiment. Of course, there are also further possible embodiments. For example it is possible to provide the first and third sensors not at the end stop but rather at the motor for moving the spoiler, which sensors then sense the end positions by the movement and by counting the pulses during the movement of the motor.

The invention claimed is:

1. A device for sensing a position of a spoiler on a motor vehicle, the spoiler can be moved with a drive unit between a retracted setpoint base position and at least one extended setpoint operating position, the device comprising:
   at least one Hall sensor for sensing at least one of the retracted setpoint base position and the extended setpoint operating position of the spoiler, said Hall sensor generating first position signals on a basis of a sensed setpoint position;
   an adjustment position sensing device for sensing a current position of the spoiler and generating second position signals on a basis of a sensed current position;
   an information device; and
   an evaluation unit for evaluating the first position signals supplied by said Hall sensor and the second position signals supplied by said adjustment position sensing device, said evaluation unit, on a basis of an evaluation result, actuating at least one of the drive unit and said information device to provide a driver with information about a state of said Hall sensor, said evaluation device configured to sense an absence of the first position signals being Hall signals, and when the Hall signals are absent after a predeterminable time, measured from a start of a movement of the spoiler to at least one setpoint position, said evaluation unit decides, using the second position signals, whether the spoiler is located within a setpoint tolerance range about the at least one setpoint position, and if:
   a) said evaluation unit determines that the spoiler is located in the setpoint tolerance range; or
   b) said evaluation unit determines that the spoiler is not located in the setpoint tolerance range;
   said evaluation unit actuates at least one of the drive unit or said information device.

2. The device according to claim 1, wherein:
   in a case of a), said information device outputs a first signal perceived in at least one of a visual fashion, an acoustic fashion and a tactile fashion by the driver, the first signal providing the driver with information about a possible defect in said Hall sensor; and
   in a case b), said information device outputting a second signal perceived in at least one of a visual fashion, an acoustic fashion, and a tactile fashion by the driver, the second signal providing the driver with information about a possible defect in the drive unit.

3. The device according to claim 1, wherein said evaluation unit compares a second position represented by the second position signals with a first position represented by the first position signals when the extended setpoint operating position is displayed by said Hall sensor, and if a deviation between the first position and the second position lies outside a predefinable position tolerance range, said evaluation unit actuates at least one of the drive unit and said information device.

4. The device according to claim 3, wherein when there is a deviation between the first position and the second position, said information device outputs a signal which can be perceived in at least one of a visual fashion, an acoustic fashion and a tactile fashion by the driver, the signal providing the driver with information about a possible defect in said Hall sensor.

5. The device according to claim 1, wherein said adjustment position sensing device is embodied on the drive device.

6. The device according to claim 1, wherein said adjustment position sensing device has a restoring device, such that a predetermined value for a position can be set when the first position signals from the Hall sensor and the second position signals from said adjustment position sensing device correspond.

7. The device according to claim 5, wherein said adjustment position sensing device is a travel measuring device having an incremental signal transmitter and with which travel carried out by the spoiler can be sensed.

* * * * *